(12) United States Patent
Namburu et al.

(10) Patent No.: US 11,704,232 B2
(45) Date of Patent: Jul. 18, 2023

(54) SYSTEM AND METHOD FOR AUTOMATIC TESTING OF DIGITAL GUIDANCE CONTENT

(71) Applicant: Whatfix Private Limited, Bangalore (IN)

(72) Inventors: Maruthi Priya Kanyaka Vara Kumar Namburu, Bengalaru (IN); Gourav Dhelaria, Bangalore (IN); Ashwath Cs, Bangalore (IN); Niyati Agrawal, Bangalore (IN)

(73) Assignee: Whatfix Private Limited, Bangalore (IN)

( * ) Notice: Subject to any disclaimer, the term of this patent is extended or adjusted under 35 U.S.C. 154(b) by 0 days.

(21) Appl. No.: 17/234,743

(22) Filed: Apr. 19, 2021

(65) Prior Publication Data
US 2022/0334957 A1    Oct. 20, 2022

(51) Int. Cl.
G06F 9/44        (2018.01)
G06F 11/36       (2006.01)
G06F 11/30       (2006.01)

(52) U.S. Cl.
CPC ...... *G06F 11/3688* (2013.01); *G06F 11/3072* (2013.01); *G06F 11/3684* (2013.01); *G06F 11/3692* (2013.01)

(58) Field of Classification Search
CPC ............ G06F 11/3688; G06F 11/3072; G06F 11/3684; G06F 11/3692
See application file for complete search history.

(56) References Cited

U.S. PATENT DOCUMENTS 7,203,620 B2    4/2007  Li
7,415,675 B2    8/2008  Habon et al.
(Continued)

FOREIGN PATENT DOCUMENTS

WO    WO02/29759 A2      4/2002
WO    WO2010/141748 A1   12/2010

OTHER PUBLICATIONS

MDN Web Docs; CSS selectors; 9 pages; retrieved from the interent (https://developer.mozilla.org/en-US/docs/Web/CSS/CSS_Selectors) on Aug. 6, 2020.
(Continued)

*Primary Examiner* — Chat C Do
*Assistant Examiner* — Lenin Paulino
(74) *Attorney, Agent, or Firm* — Shay Glenn LLP

(57) ABSTRACT

Provided herein are systems and methods for creating, testing and providing digital guidance for use in an underlying computer application. In one exemplary implementation, a method includes using a browser extension to record steps of digital guidance content as the steps are created by a content author, automatically testing the content with the same browser and making the tested content available for playback. The testing may include receiving an execute testing command, fetching test case data from a server, executing a test case in the browser using the test case data, running tests on the test case in a background tab of the browser, recording passes and or failures of the tests, sending reports of the passes and failures to the server, sending a notification to the content author that the testing results are ready to view, and displaying the testing results in the dashboard.

10 Claims, 9 Drawing Sheets

(56) References Cited

U.S. PATENT DOCUMENTS

| | | | |
|---|---|---|---|
| 7,533,369 B2 | 5/2009 | Sundararajan et al. | |
| 7,849,405 B1 | 12/2010 | Coletta et al. | |
| 7,861,178 B2 | 12/2010 | Lui et al. | |
| 8,151,202 B1 | 4/2012 | Cronin et al. | |
| 8,707,177 B1 | 4/2014 | Parle et al. | |
| 8,850,315 B1 | 9/2014 | Rogers et al. | |
| 9,063,757 B2 | 6/2015 | Horton et al. | |
| 9,367,199 B2 | 6/2016 | Klemenz et al. | |
| 9,514,437 B2 | 12/2016 | Becker et al. | |
| 9,582,132 B1* | 2/2017 | Adelman | G06F 3/048 |
| 9,727,348 B2 | 8/2017 | Chen et al. | |
| 10,489,041 B1 | 11/2019 | Edwards et al. | |
| 10,585,686 B2 | 3/2020 | Saurabh | |
| 10,802,846 B2 | 10/2020 | Rider et al. | |
| 2001/0017622 A1 | 8/2001 | Patel et al. | |
| 2005/0147054 A1 | 7/2005 | Loo et al. | |
| 2006/0036991 A1* | 2/2006 | Biazetti | G06F 9/453 |
| | | | 717/104 |
| 2006/0085750 A1 | 4/2006 | Easton et al. | |
| 2006/0117315 A1 | 6/2006 | Bussert et al. | |
| 2006/0277468 A1 | 12/2006 | Sapir | |
| 2007/0168864 A1 | 7/2007 | Yamamoto et al. | |
| 2008/0301558 A1 | 12/2008 | Najafi et al. | |
| 2010/0180185 A1 | 7/2010 | O'Hanlon | |
| 2010/0205529 A1 | 8/2010 | Butin et al. | |
| 2010/0205530 A1 | 8/2010 | Butin et al. | |
| 2011/0010612 A1 | 1/2011 | Thorpe et al. | |
| 2011/0035486 A1 | 2/2011 | Seolas et al. | |
| 2011/0307818 A1 | 12/2011 | Eby et al. | |
| 2013/0055201 A1 | 2/2013 | No et al. | |
| 2013/0097497 A1 | 4/2013 | Matejka et al. | |
| 2013/0129316 A1 | 5/2013 | Dontcheva et al. | |
| 2013/0326406 A1 | 12/2013 | Reiley et al. | |
| 2014/0316363 A1 | 10/2014 | You et al. | |
| 2014/0344683 A1* | 11/2014 | Urunga | G06F 9/453 |
| | | | 715/705 |
| 2015/0202529 A1 | 7/2015 | Paradise et al. | |
| 2015/0220312 A1 | 8/2015 | Jemiolo | |
| 2015/0242304 A1* | 8/2015 | Akbulut | G06F 3/04842 |
| | | | 714/38.1 |
| 2015/0254713 A1 | 9/2015 | Brewer et al. | |
| 2016/0004628 A1* | 1/2016 | Gugri | G06F 11/3688 |
| | | | 717/124 |
| 2016/0019387 A1 | 1/2016 | Sol et al. | |
| 2016/0162167 A1* | 6/2016 | Shabazz | G06F 11/3414 |
| | | | 715/704 |
| 2016/0246467 A1 | 8/2016 | Jemiolo et al. | |
| 2016/0246615 A1 | 8/2016 | Jemiolo et al. | |
| 2016/0247534 A1 | 8/2016 | Pan et al. | |
| 2016/0350137 A1 | 12/2016 | Kihara | |
| 2016/0351189 A1 | 12/2016 | Miller et al. | |
| 2017/0052824 A1 | 2/2017 | Sharma et al. | |
| 2017/0134828 A1 | 5/2017 | Krishnamurthy et al. | |
| 2017/0139656 A1 | 5/2017 | Sterling et al. | |
| 2017/0177385 A1 | 6/2017 | Fung et al. | |
| 2017/0228349 A1 | 8/2017 | Yang et al. | |
| 2017/0316363 A1 | 11/2017 | Siciliano et al. | |
| 2017/0337122 A1* | 11/2017 | Bolajwar | G06F 11/34 |
| 2018/0121047 A1 | 5/2018 | Goel et al. | |
| 2018/0143842 A1 | 5/2018 | Weiss et al. | |
| 2019/0065512 A1 | 2/2019 | Pestana et al. | |
| 2019/0066731 A1 | 2/2019 | Jarrell | |
| 2019/0318764 A1 | 10/2019 | Ishida et al. | |
| 2019/0370559 A1 | 12/2019 | Carter et al. | |
| 2020/0021872 A1 | 1/2020 | Venkatraman et al. | |
| 2020/0035113 A1 | 1/2020 | Bruce et al. | |
| 2020/0225927 A1 | 7/2020 | Pachpande et al. | |
| 2021/0042134 A1 | 2/2021 | Elango et al. | |
| 2021/0158438 A1 | 5/2021 | Greenberg et al. | |

OTHER PUBLICATIONS

Interactions Foundation; Hehp! I need some help! Not just any help hel p in mobile applications; 10 pages; retreived from the internet (https://www.interaction-design.org/literature/article/help-i-need-some-help-not-just-any-help-help-in-mobile-applications) on Aug. 6, 2020.

Userlane; 100 percent proficient with any software without it training; 13 pages; retrieved from the internet (https://blog.userlane.com/navigation-system-software/) on Aug. 6, 2020.

Yeo: Here's how this company is tackling the challenges of enterprise tech adoption; 6 pages; retrieved from the internet (https://www.techinasia.com/heres-company-tackling-challengess-enterprise-tech-adoption) on August 6. 2020.

Namburu et al.; U.S. Appl. No. 16/914,227 entitled "Element detection," filed Jun. 26, 2020.

Namburu et al.; U.S. Appl. No. 16/914,219 entitled "System and method for automatic segmentation of digital guidance content," filed Jun. 26, 2020.

Sanghai et al.; U.S. Appl. No. 17/643,683 entitled "System and method for personalizing digital guidance content," filed Dec. 10, 2021.

* cited by examiner

FIG. 4A

SYSTEM AND METHOD FOR AUTOMATIC TESTING OF DIGITAL GUIDANCE CONTENT

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

There are many ways for end users to learn how to use a particular software application. Increasingly, many methods take the form of digital guidance, such as a Help Section built into the software application or links to online help content. Examples of online help or learning content include knowledge bases, answers to Frequently Asked Questions (FAQs), tutorials, videos, PDF documents, etc. "Walk-throughs" may be provided in either scenario, wherein the user is walked through a particular task or process step by step in the actual software application.

All of the digital guidance content may be provided to a user in one place, organized with a table of contents and or an index, and it may be searchable using keywords. Still, it may be overwhelming to a user to be provided with so much content at once. It is desirable to only provide a limited amount of digital guidance content to a user at any one time, focused on what they may currently need help with and not showing them content that is not currently relevant to what they are doing. Accordingly, a limited number of hyperlinks or other pathways to relevant content may be provided in various sections or segments of the software, and these links may change depending on the task being performed by the end user and or their location in the software application.

Creating the above-mentioned links can be a very time consuming and error prone process for a creator/editor of the digital guidance content, particularly when the amount of content becomes large. The process of filtering or mapping the digital guidance content to various locations in the application can be a source of errors in the content. This problem is exacerbated when new content is added to the guidance and or new pages or locations are added to the underlying software application. Accordingly, it is desirable to test the content before deploying it to uncover these and other errors that may occur, and test the content again each time it or the underlying application is updated. Such testing is currently performed by a dedicated, centralized system residing on a public server.

What is needed and is not provided by the prior art are improved systems and methods for testing digital guidance content, while reducing the burden being placed on the creators of the content, particularly when the underlying application is not accessible on a public network. The innovations described herein solve these unmet needs and provide additional advantages.

SUMMARY OF THE DISCLOSURE

According to aspects of the present disclosure, an exemplary method of creating, testing and providing digital guidance for use in an underlying computer application includes using an extension of a browser on a computer to record steps of digital guidance content as the steps are created by a content author, automatically testing, with the same browser on the same computer, the digital guidance content, and making the tested digital guidance content available for playback to an end user on a computing device. The testing may include receiving an execute testing command from the content author on a dashboard, fetching test case data from a server to the browser extension, executing a test case in the browser using the test case data, running tests on the test case in a background tab of the browser, recording in the browser extension passes and or failures of the tests, sending reports of the passes and failures of the tests from the browser extension to the server, sending a notification to the content author that the testing results are ready to view, and displaying the testing results in the dashboard. The browser extension may reside on a closed network behind a firewall along with the application being tested such that the application being tested need not be accessible to an open network for the digital guidance content testing to occur.

In some embodiments, each of the steps of the automatic testing of the digital guidance content are performed on multiple browsers simultaneously. The multiple browsers may include different browser types. In some embodiments, the steps of the automatic testing are performed in the background of each of the browsers. Each of the browsers may be running on a separate computer. In some embodiments, a user of each of the separate computers opts into a pool allowing their computer to be used for the testing.

According to aspects of the present disclosure, an exemplary non-transitory computer readable medium has instructions stored thereon for creating, testing and providing digital guidance in an underlying computer application. The instructions are executable by a processor to cause a computer to use an extension of a browser on a computer to record steps of digital guidance content as the steps are created by a content author, automatically test, with the same browser on the same computer, the digital guidance content, and make the tested digital guidance content available for playback to an end user on a computing device. The testing may include receiving an execute testing command from the content author on a dashboard, fetching test case data from a server to the browser extension, executing a test case in the browser using the test case data, running tests on the test case in a background tab of the browser, recording in the browser extension passes and or failures of the tests, sending reports of the passes and failures of the tests from the browser extension to the server, sending a notification to the content author that the testing results are ready to view, and displaying the testing results in the dashboard. The browser extension may be configured to reside on a closed network behind a firewall along with the application being tested such that the application being tested need not be accessible to an open network for the digital guidance content testing to occur.

In some embodiments, the instructions of the non-transitory computer readable medium are configured to have each of the steps of the automatic testing of the digital guidance content performed on multiple browsers simultaneously. The multiple browsers may be of different browser types. In some embodiments, the instructions are configured to have the steps of the automatic testing performed in the background of each of the browsers. The instructions may be configured to have each of the browsers running on a separate computer. In some embodiments, the instructions are configured to permit a user of each of the separate computers to opt into a pool allowing their computer to be used for the testing.

BRIEF DESCRIPTION OF THE DRAWINGS

The novel features of the disclosure are set forth with particularity in the claims that follow. A better understanding of the features and advantages of the present disclosure will be obtained by reference to the following detailed description that sets forth illustrative embodiments, in which the principles of the disclosure are utilized, and the accompanying drawings of which:

FIGS. 4A and 4B are screenshots showing examples of different lists of walkthroughs that are displayed by a content playback module depending on the location of an end user in an underlying software application.

DETAILED DESCRIPTION

Described herein are apparatuses (e.g., systems, computing device readable media, devices, etc.) and methods for an improved digital guidance platform. The innovative platform changes the way application support and learning content is consumed. In some embodiments, this is accomplished by providing contextual and interactive walkthroughs inside software applications at the time a task is being performed (i.e. providing real-time guidance to users.) Examples of software applications that the platform may be used with include Salesforce®, Oracle CRM®, Microsoft Dynamics®, Success Factors®, SharePoint® and other applications. In some embodiments, the innovative platform may take the form of a simple web browser extension. Developers of a software application may use the extension to provide guided navigation to users of the software application so that the users can quickly learn how to use the application. The users' training and or support experience can be enhanced with walkthroughs, smart pop-ups and tool-tips provided by the platform. These platform tools may be configured to show up based on a particular user's role and current location in the software application. The innovative platform may be used with enterprise application software (such as the software applications mentioned above), custom application software (such as created by an IT department for a company's internal use), and end user software. Depending on the application, the innovative platform may the only training and support program for the application, or it may be used in conjunction with a training and support program native to the application.

In some embodiments, the innovative platform supports an end user through their entire life cycle with a software application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Figure 1:
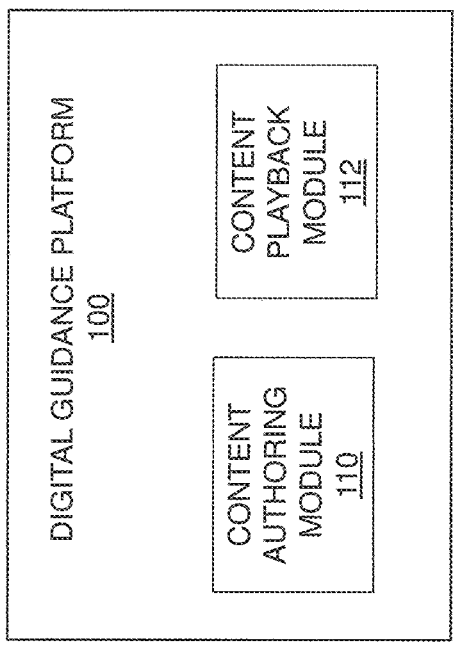
FIG. 1 is a diagram showing an example of a digital guidance platform configuration for providing digital guidance in an underlying computer application.

Referring to FIG. 1, an exemplary digital guidance platform 100 is depicted. It may include a content authoring module 110 (also referred to as an editor) and a content playback module 112, as shown. In this exemplary embodiment, the content authoring module 110 allows a content author to create digital guidance for end users of an underlying software application. Once this content is created and saved, it may be accessed or "played back" using the content playback module 112. In some implementations, the content authoring module 110 and the content playback module 112 are combined and provided to a content author in a single software package. In use, the software package may reside on a content author's computer, and or may reside on a server in "the cloud" and be offered as Software as a Service (SaaS.) In other implementations, content authoring module 110 and a content playback module 112 may be separately deployed. For example, one of the modules may take the form of a simple web browser extension as previously mentioned, and the other module may be downloaded to a content author's computer.

Figure 2:
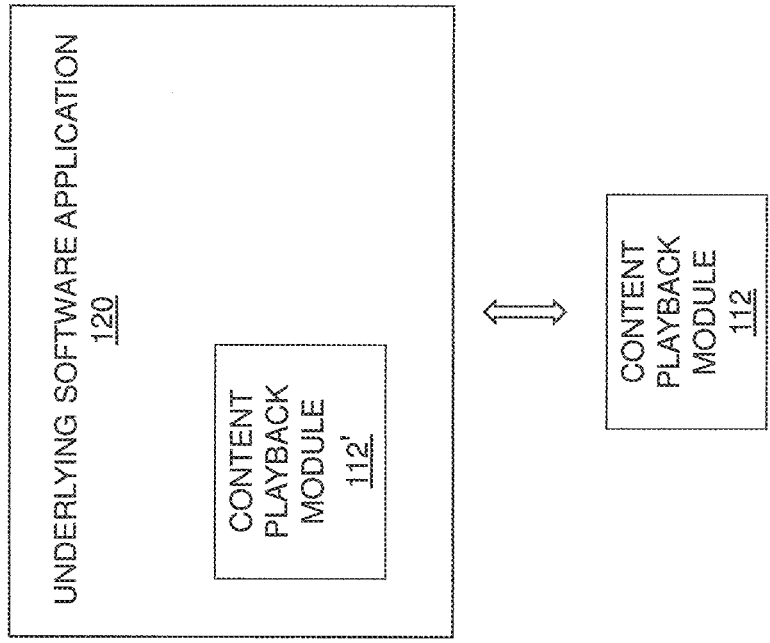
FIG. 2 is a diagram showing exemplary configurations of how the digital guidance platform of FIG. 1 interfaces with an underlying computer application.

Referring to FIG. 2, exemplary content playback configurations are depicted. In some implementations, content playback module 112 is a standalone system that is accessed by an end user from within an underlying software application 120. For example, an underlying software application 120, such as Salesforce®, may be provided with links to access content playback module 112, which is located on a server in the cloud. In some implementations, content playback module 112' may be integrated within the underlying software application 112'. In either of these exemplary configurations, the end user is able to access the digital guidance content from content playback module 112 or 112' while using a feature of underlying software application 120 with which the content is associated. In some implementations, both an integrated content playback module 112' and an external module 112 are available to the end user.

Figure 3A:
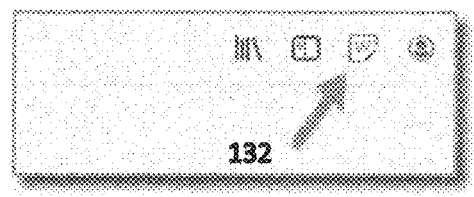
FIGS. 3A-3I are a series of partial screenshots showing exemplary functionality of a content authoring module/editor.

Referring to FIGS. 3A-3I, exemplary functionality of content authoring module/editor 110 will be described in relation to the exemplary partial screenshots in the figures. In this exemplary embodiment, the patent applicant's company name "whatfix" is used as the name of digital guidance platform 100. The exemplary functionality includes the ability to create a "walkthrough", which will walk an end user of underlying software application 120 through each sequential step of a particular task in application 120 when the walkthrough is played back. In some implementations, the walkthrough can proceed either one step at a time, waiting at the end of each step for the end user to advance the walkthrough to the next step. Alternatively, the walkthrough can proceed automatically, running through all of the steps without stopping (unless paused by the user.) Additionally, the walkthrough can provide the end result of the task that the walkthrough is teaching. For example, a walkthrough can show an end user each step needed to determine the number of open sales leads that have not been contacted, and at the end of the walkthrough the actual number is provided to the end user. Referring first to FIG. 3A, the creation of a walkthrough begins by the author logging in to the underlying application where the author wants to create content, and then launching the previously described content authoring module/editor 110 by clicking icon 132.

Figure 3B:
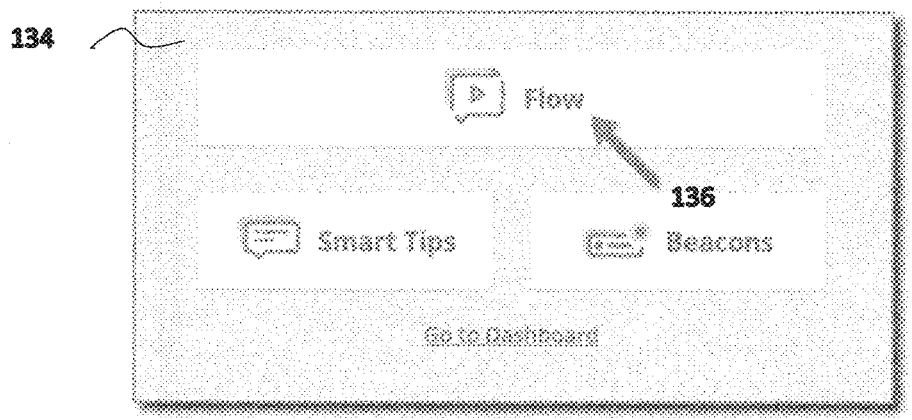

Once the editor launches, it displays window 134 as shown in FIG. 3B. Window 134 includes three buttons labeled Flow, Smart Tips and Beacons. The Flow button is for creating walkthroughs, the Smart Tips button is for creating content associated with data field validation, and the Beacons button is for creating content associated with software application change management. In this example the author clicks the Flow button 136.

Figure 3C:
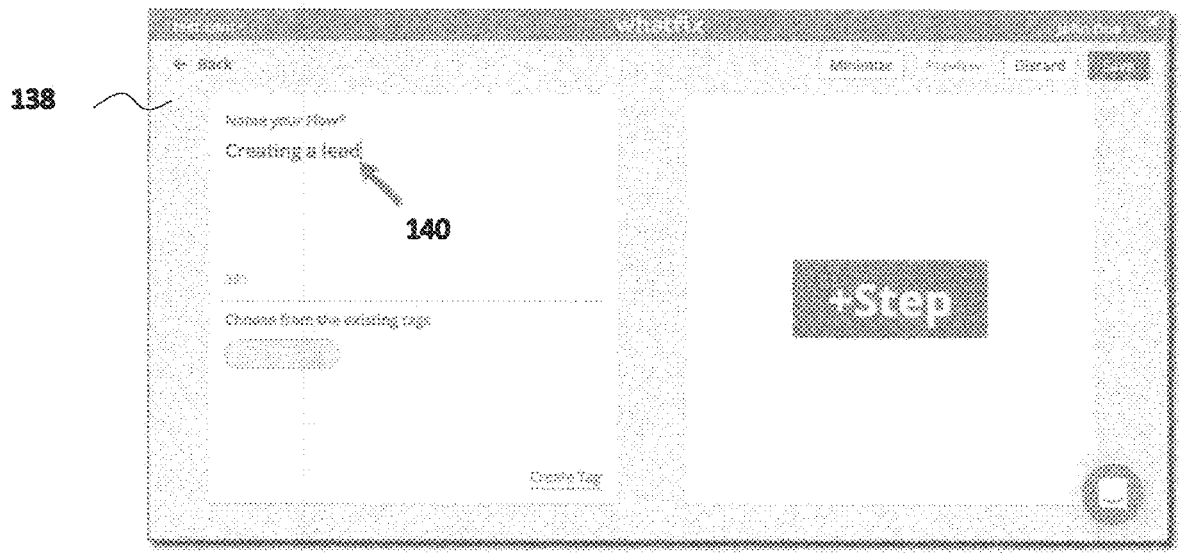

Clicking Flow button 136 opens window 138, as shown in FIG. 3C. Here the author can name the Flow or walkthrough as they want it to be displayed to an end user. In this example, the Flow is named "Creating a lead", as shown by arrow 140.

Figure 3D:
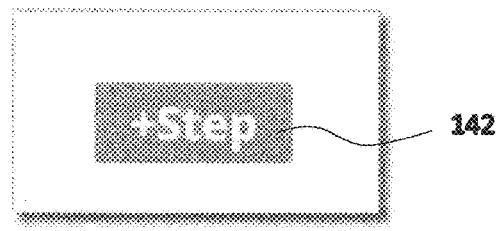
Figure 3E:
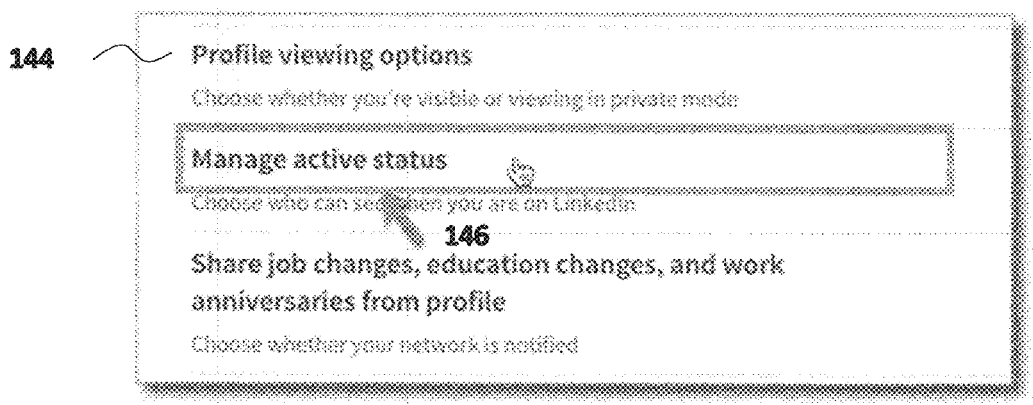

The author then clicks the +Step button 142, as shown in FIG. 3D. In some embodiments, the pointer icon changes (such as from an arrow to a hand), as shown in screen 144 of FIG. 3E, to indicate that the editor is waiting for the author to select a step of the sequence that the end user is to be guided through. The author then clicks the desired element on the page of the underlying software application that the end user will need to select. In this example, the end user will be guided to select the Manage Active Status button 146 on screen 144 during playback of the walkthrough, so the Flow author clicks button 146 at this time.

Figure 3F:

\After the Flow author clicks the desired element 146, the editor module displays screen 148 as shown in FIG. 3F with automatically generated action text 150 describing the particular step. The Flow author may then review, edit and or add text or other information associated with the step. The author may also select other parameters regarding how this step of the walkthrough will be played back, such as the position of the Tooltip on the screen, or accept some or all of the default settings. Once the parameters of this step are in order, the author then clicks the Add Step button 152.

Figure 3G:
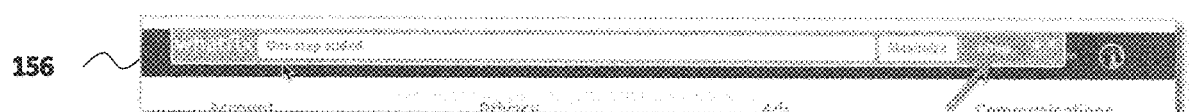
Figure 3H:
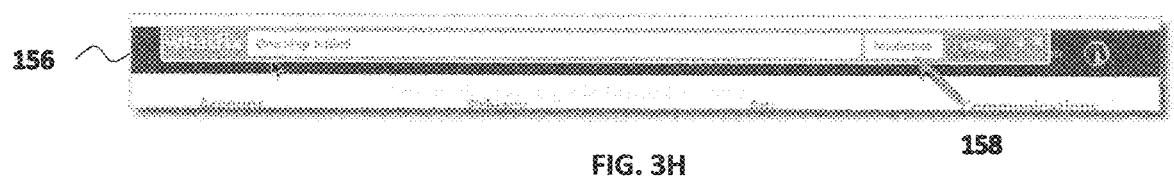
Figure 3I:
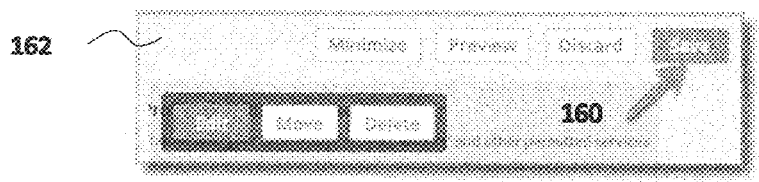

To capture the next step in the sequence, the Flow author then navigates to where in the underlying software application the author wants to start the next step. The author then clicks the +Step button 154 in the editor toolbar 156, as shown in FIG. 3G. The pointer icon again changes to indicate that the editor is waiting for the author to select another step of the sequence, as previously described in reference to FIG. 3E. The author then repeats the intervening actions described above for each step that is to be added to the Flow sequence. When all the steps have been captured, the author clicks the Maximize button 158 on the editor toolbar 156, as shown in FIG. 3H, and then clicks the Save button 160 after window 162 opens, as shown in FIG. 3I.

Before various walkthroughs are made available to end users of the underlying software application, segmentation or mapping may be used to associate each walkthrough with a particular page or part of the underlying software. Segmentation helps content authors display only walkthroughs that are relevant to end users when they are on a particular page. Segmentation, as the name implies, provides a way of targeting walkthroughs to specific users on "widgets" like Self-help and Task List on previously described content playback module 112. Segments can be defined through various conditions and rules. In some embodiments, a segment can be built to filter walkthroughs as per user login, the contents of a Uniform Resource Locator (URL), elements on the screen, and/or a mix of other criteria. For example, segments may be used to display walkthroughs based on a particular group of users' logins, a current tab an end user is on, visual elements on pages of the underlying software and/or other variable(s) defined by the walkthrough author.

Figure 4A:
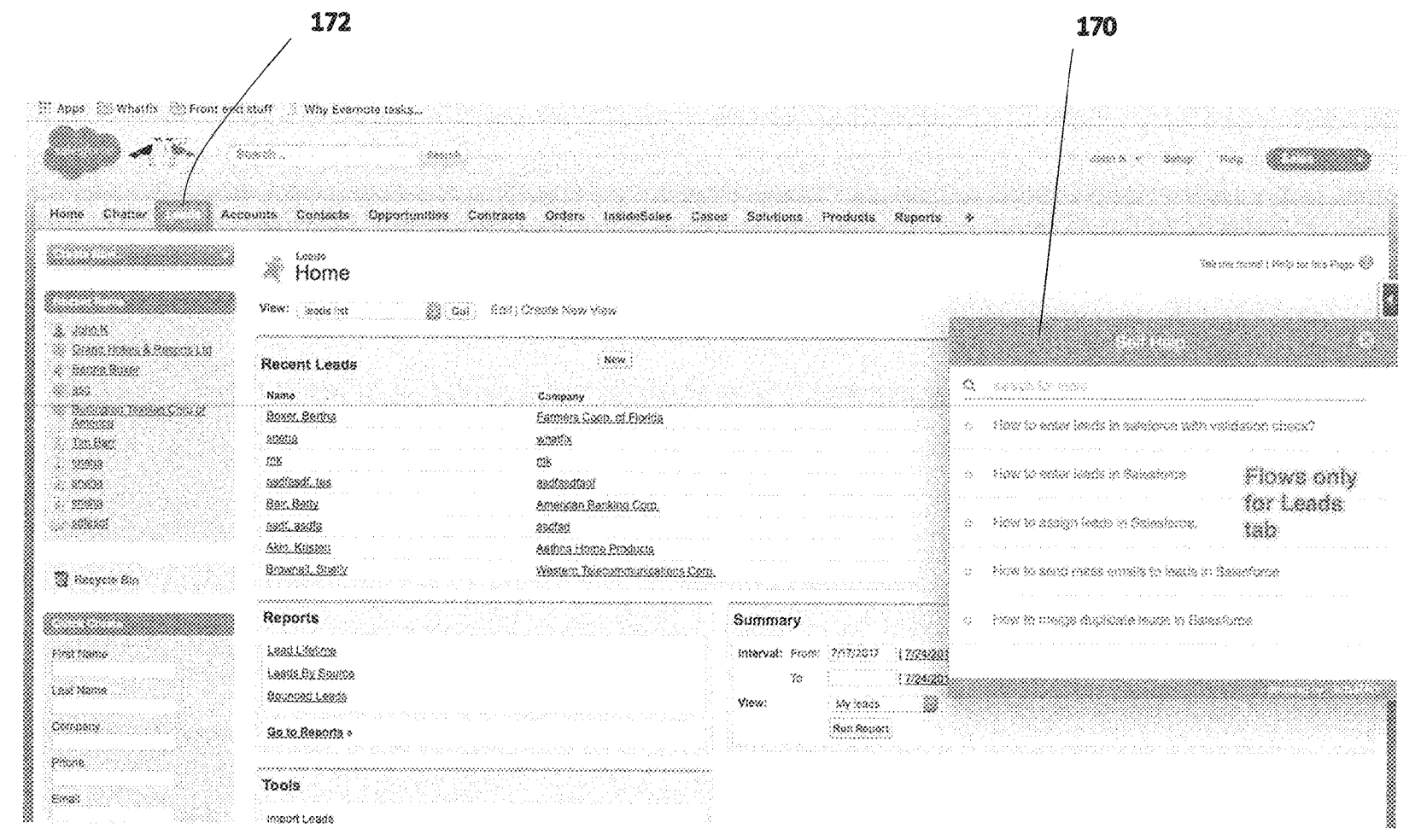
Figure 4B:
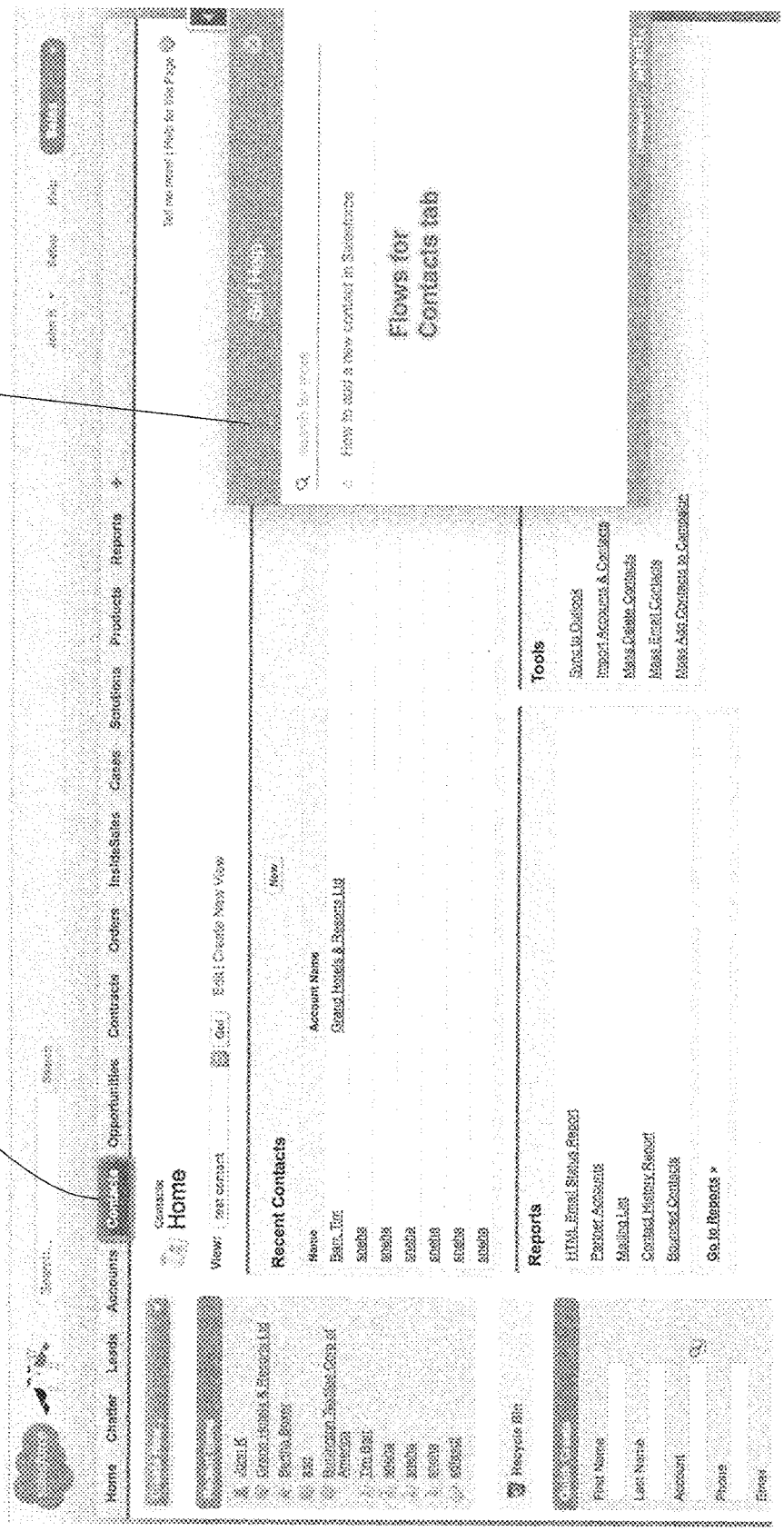

In one embodiment, a page of the underlying software application may have two different tabs, for example: Leads and Contacts. Using segments, different walkthroughs can be displayed depending on which tab the end user navigates to. Rather than seeing a long list of help content, the end user only sees contextual content that is relevant to the particular page and tab currently being used. FIG. 4A shows an example of a list of walkthroughs 170 that is displayed by content playback module 112 when the end user has navigated to the Leads tab 172 of an underlying Salesforce application and clicked on Self Help. FIG. 4B shows an example of a different list of walkthroughs 174 that is displayed by module 112 when the end user has navigated to the Contacts tab 176.

Segments can be created through a simple selection of walkthroughs and visibility rules provided in the editor module 110. To segment walkthroughs, an author can manually select all the necessary flows/walkthroughs to display on a particular page of the application. Segmentation can be set up based on tags as well. Tags can be as simple as a user group or the page/module name. Segmentation of flows can be set up through single or multiple tags. In some embodiments, the editor module 110 can perform segmentation on the basis of visual elements found in the application. The editor can segment flows based on visual elements present or absent on various pages of the underlying application.

Referring to FIGS. 5A-5I, specific examples of types of segmentation criteria that may be used are provided.

Figure 5A:
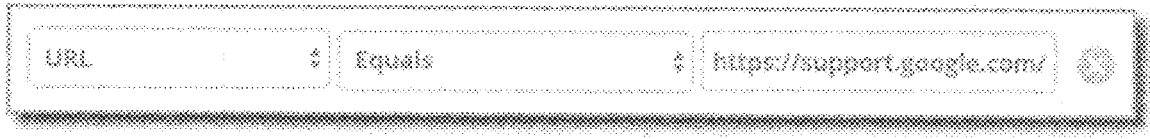
FIGS. 5A-5I are a series of partial screenshots showing examples of types of segmentation criteria.

Referring to FIG. 5A, a Uniform Resource Locator (URL) may be used to segment flows. In some embodiments, any part of the URL may be specified as a visibility rule. For example, the URL Hostname, path, parameter, etc. may be specified using this criterion.

Figure 5B:

Referring to FIG. 5B, a URL Hostname may be used to segment flows. In some implementations, a content author may want to uniquely identify a page using the domain name and can use this condition. The URL Hostname is the first part of any URL. For example, if the author wished to display the tip only if the end user is on google.com, she can add a condition as shown in the screenshot of FIG. 5B.

Figure 5C:
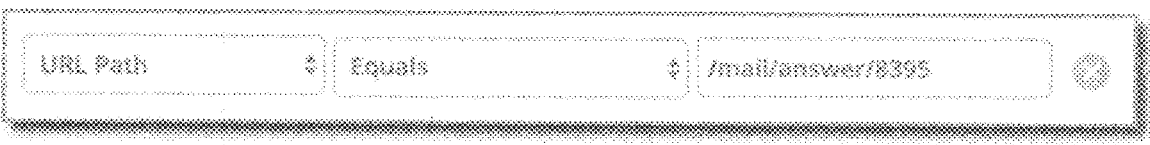

Referring to FIG. 5C, a URL Path may be used to segment flows. The website path name is what is listed between a domain name and the parameters or hashes. For example, if the website URL is //support.google.com/mail/answer/8395?hl=en&ref_topic=3394219, then the pathname is/mail/answer/8395. This condition may be specified as shown in FIG. 5C.

Figure 5D:
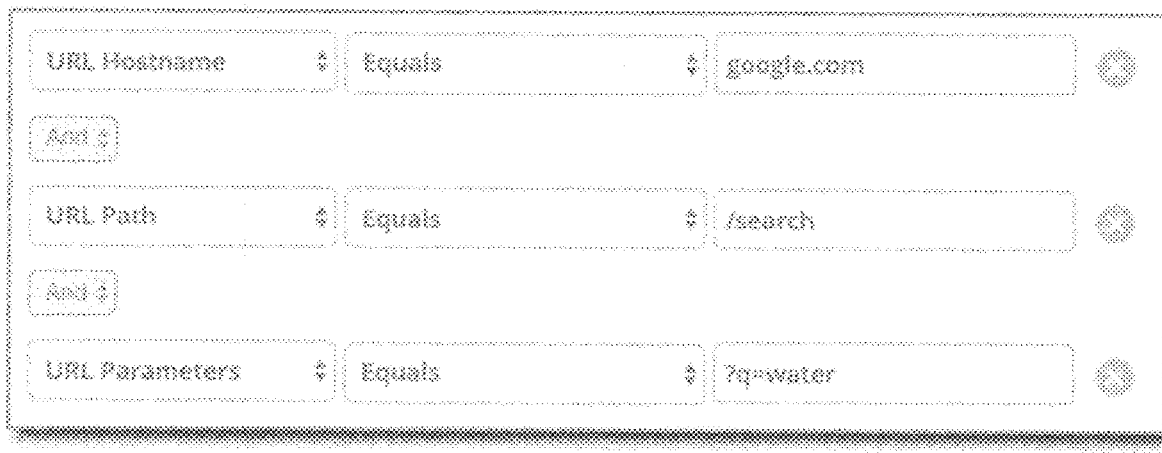

Referring to FIG. 5D, a URL Parameter may be used to segment flows. If an author wishes to identify a web page using the parameters on the URL, this condition may be used. For example, if a tip is to be shown to a user only when the search phrase has "water" in Google, this can be set up as shown in FIG. 5D. In this example, three conditions need to be met: 1) the page must be google.com (URL Hostname); 2) the pathname is/search (URL Path); and 3) the query parameter is ?q=water.

Figure 5E:

Referring to FIG. 5E, a URL Hash may be used to segment flows. In particular, a page may be identified using the hash value of the URL using this condition. Hashes are usually present in Single page applications made using AngularJs or ReactJs. Typically, there are no page refreshes but only Hash changes.

Figure 5F:
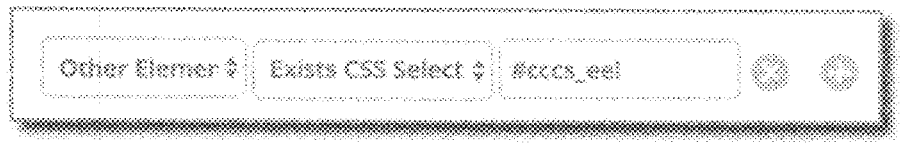

Referring to FIG. 5F, Other Elements may be used to segment flows. For example, if a content author wants to identify a page based on the presence of a particular element (other than the one selected by the author for the flow) on the web page, this condition can be used. In some embodiments, the values passed to this condition are Cascading Style Sheets (CSS) selectors, such as #ID, .class or Jquery. Cascading Style Sheets is a stylesheet language used to describe the presentation of a document written in HTML or XML. CSS describes how elements should be rendered on screen or on other media. Note that in some implementations, use of this condition to segment flows can slow down the underlying application. Further information on the use of CSS selectors may be found on the internet, such as at https://developer.mozilla.org/en-US/docs/Web/CSS/CSS_Selectors.

Figure 5G:
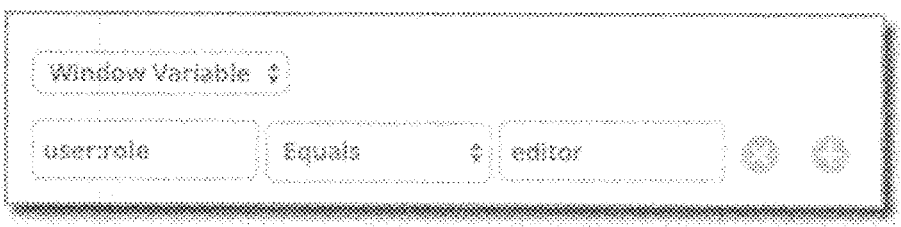

Referring to FIG. 5G, a Window Variable may be used to segment flows. In some implementations, a value of a particular JavaScript global variable is used to identify conditions for showing tooltips. For example, an option to check "user.role='admin'" may be provided to set this condition. This option may also be to perform comparisons, such as using the following criteria: Greater than; Less than; Date Greater than; or Date Less than.

Figure 5H:
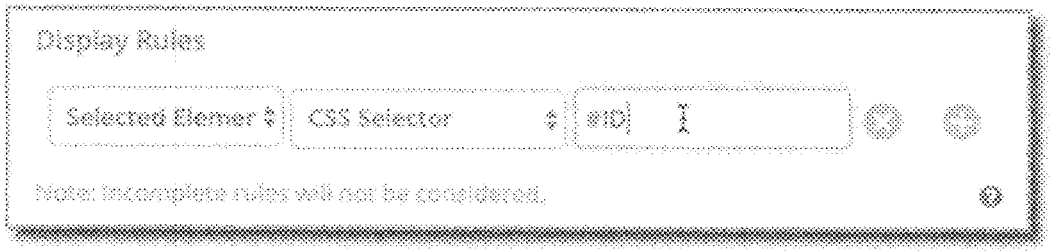

Referring to FIG. 5H, an Element CSS Selector/JQuery may be used to segment flows. In some implementations, the application uses unique IDs for some elements on the page. This option may be used when the element is selected from a list of options. For example, a drop-down menu. This lets an author provide their own CSS selector identifier for the element. Sample values include: #ID_ELEMENT; CLASS-NAME; input[title="Search"]; and $("#ID").

Figure 5I:
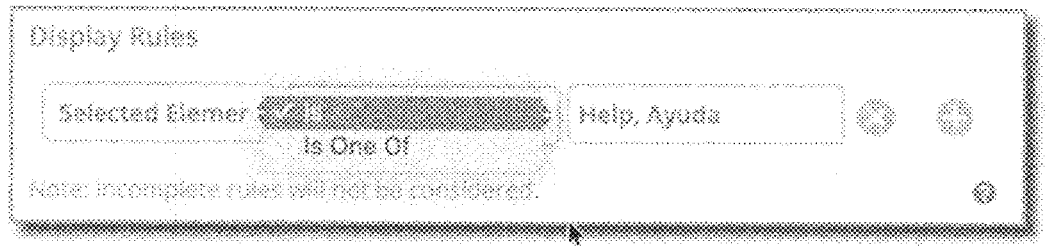

Referring to FIG. 5I, an Element Text may be used to segment flows. In some implementations, this is the text that is displayed on the Element selector that is described above in reference to FIG. 5H. If an application supports multiple languages, the option "is one of" may be chosen and the name added with a comma (,) as a delimiter.

The exemplary segmentation criteria described above with reference to FIGS. 5A-5I may be used to manually segment various flows/walkthroughs and other content. According to aspects of the disclosure, editor module 110 may also be configured to automatically segment the content. In some embodiments, the content is automatically segmented as it is created, with no additional steps required by the content author. This may be referred to as "intelligent segmentation" (IS). In some embodiments, intelligent segmentation eliminates the need to create multiple segments (manually) to display relevant content contextually to different audiences on an underlying application. For example, if an underlying application has five pages and two user roles, traditionally ten segments would need to be created to ensure that each kind of user sees only the relevant topics on each of the five pages. But when intelligent segmentation is enabled and content is being created, editor module 110 can automatically determine which content is to be shown on which page. In some embodiment, editor module 110 can do this based on where the walkthrough was created and certain other pre-defined criterion. The content author need not do any additional configuration as more content is created.

Intelligent segmentation can also ensure that if an end user is not on the first screen of a walkthrough, playback of the walkthrough starts from the most relevant page that the user is on. For example, the walkthrough that the user is launching may have 10 steps. If the user is already in step 3 on the application and then decides to launch the walkthrough, IS ensures that the walkthrough starts from step 4 and not from the earlier steps that the user has already completed.

According to aspects of the present disclosure, systems and methods are provided for automated testing of the previously described digital guidance content. In these exemplary systems and methods, the testing is decentralized and can test flows on applications which are not publicly accessible. The content testing can automatically run flows in the background and alert a user if a certain flow is not working as expected. In some embodiments, the testing method uses a tab in a user's browser window to run the automated tests. Users can open a new browser tab and initiate the content testing using a browser extension or plugin. In some embodiments, this extension is the same one that is used to create and edit flows and other digital guidance content. This is a major deviation from how digital guidance content is currently tested. Prior art systems have used dedicated testing machines connected to underlying applications residing on public networks, and tests are manually run by Quality Assurance personnel.

Figure 6:
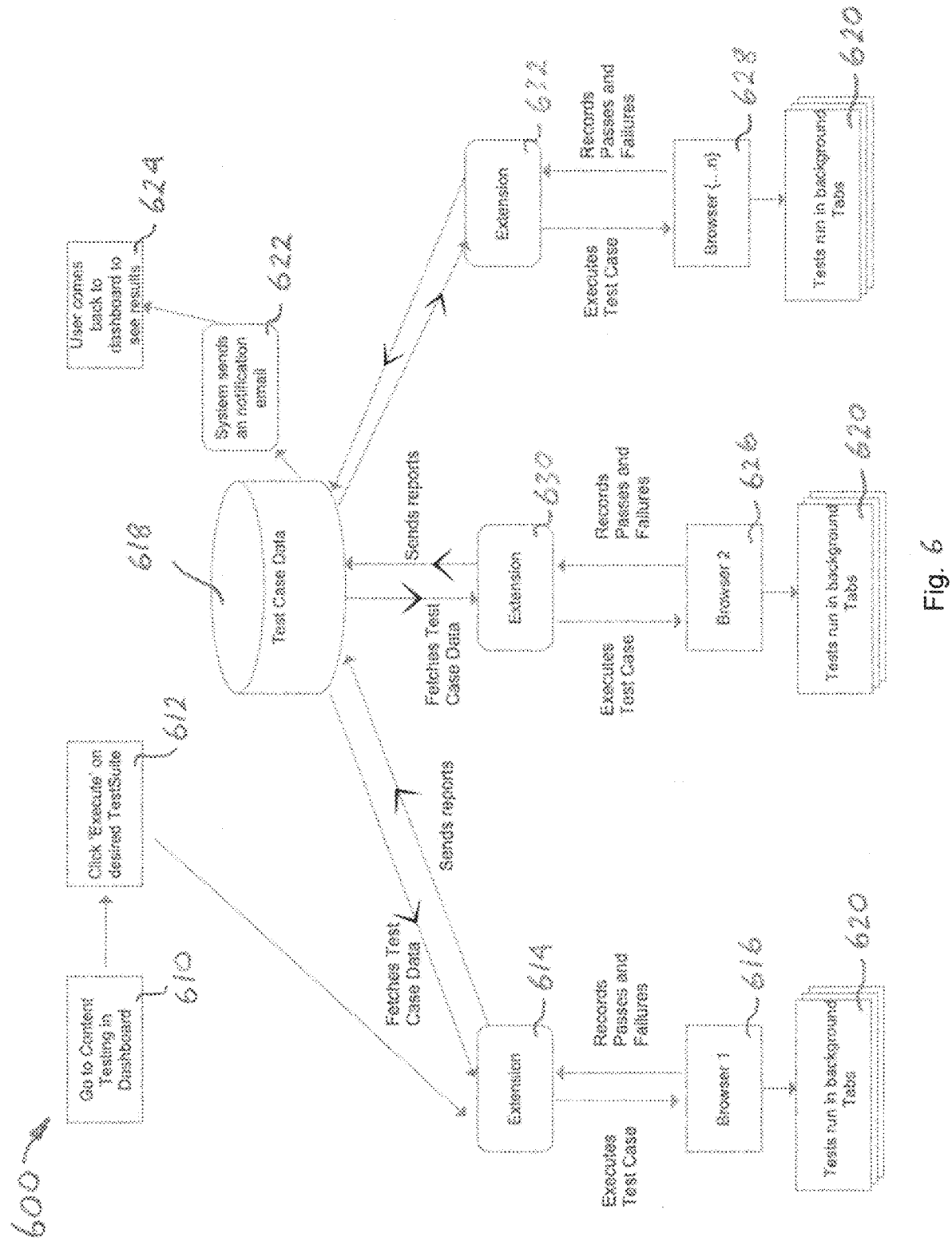
FIG. 6 is a schematic diagram showing an exemplary embodiment of an automated digital guidance content testing system.

Referring to FIG. 6, an exemplary embodiment of an automated testing system 600 implemented according to aspects of the present disclosure is shown. A user can initiate the automated testing by going to a Content Testing section of a dashboard in a browser extension or plugin, as shown in block 610. In this embodiment, the extension is the same one that is used to create the content. The user then clicks "Execute" on a desired Test Suite in 612. Once content testing is initiated in this manner, the editor plugin 614 of browser 616 can query a central server 618 for test case data, such as one operated by the developer of the editor 614. This test case data can reside on a public network or on a private network. As used herein, a "test case" refers to a walkthrough/flow plus a set of inputs used to test the flow. One walkthrough can have multiple test cases associated with it, with each test case being based on a different set of inputs. In some embodiments, just the walkthrough or details about the walkthrough are provided by central server 618 and the set of inputs used to test the flow is provided by the local computer. In other embodiments, both the walkthrough and one or more sets of inputs is provided by server 618. As used herein, "fetching test case data" refers to either of these scenarios, or to other scenarios where details of the testing to be performed are provided by server 618.

In this exemplary embodiment, editor 614 queries server 618 for pending tests and runs them one by one in the background, as shown in 620. This testing includes navigating to the underlying application with which the flows are to be tested, injecting JavaScript and running the flows in an auto execution mode. In auto execution mode, the walkthrough is started programmatically, and wherever actions are required by a user to complete the steps, the testing system script mimics the user actions appropriately. For example, if the user is expected to click on a button, then the script will mimic the click action, or if there is a text/type box provided for the user to type text into, then the script will add the input in the text/type box. These inputs come from the test case associated with the walkthrough. This is a novel concept as one of the browser tabs existing on a user's computer is being used to run flow testing using a browser extension. Application Programming Interface (API) calls may be routed through the browser extension to avoid Content Security Policy (CSP) errors, and JavaScript may be injected. This JavaScript can then be used to automate actions and test the flows. Once JavaScript is injected, it triggers the flow and performs the required step actions on behalf of the users. For example, this can be clicking on an element and or entering data in forms. In parallel, the test system monitors the progress of the flow. If the flow moves through until the last step, it is considered a successful run. Otherwise, it is labelled as a failed run.

In some implementations, the underlying application with which the digital guidance testing is tested is located on a private or closed network. By conducting the testing from a browser extension located on a machine connected to the same private network, the testing can occur without the need to pass through a firewall between the private network and an open or public network which could disrupt or prevent the testing. Additionally, when the testing occurs in an application's natural working environment (such as a customer's own machines), testing is more likely to proceed without disruption and may uncover errors that might not otherwise be found.

In some implementations, every click or other action an eventual end user would make is mimicked by testing system 600. System 600 can verify that each action in the digital guidance content is available and can perform each action to verify it functions properly with the actual underlying application. Examples of failures that may be automatically detected and documented by system 600 include the existence and location of broken links that are supposed to run help content on the underlying application, and buttons that are missing or are not identifiable. In some embodiments, extension 614 attempts to run an action for a predetermined amount of time, such as 6 minutes. If the action does not successfully complete within this time, an error is reported for that particular action.

In the exemplary embodiment shown in FIG. 6, plugin 614 captures the progress of the flow testing and sends it back to central server 618 for reporting, as shown. Server 618 can be configured to send an email to the user (see block 622) once the testing has been completed. This prompts the user to return to the editor dashboard to review the complete results, as shown in block 624. In some embodiments, the user is provided with a preview video from the dashboard showing how the content was run. For example, the video can be a screen recording of the flow executed by the testing system. The video can show every step that was carried out, all the inputs provided by the test system and where the flow stopped.

In the exemplary embodiment shown in FIG. 6, additional browsers such as 626 and 628, along with their associated extensions 630 and 632, may be used to conduct the digital guidance content testing, as shown. These multiple browsers may be employed to speed up testing. This arrangement may include different occurrences of the same browser on different computers and or different browser types on the same or different machines. Each of the browsers and extensions functions in the same manner as previously described. In some implementations, this is set up as a pool of browsers. Whenever a user of a machine opts into the pool, the browser on the machine is used to conduct a portion of the testing. If there is only a single available machine in the pool at a particular point in time, testing will be conducted only on a single tab of the single browser. The browser pool may be automatically coordinated by the browser extension that initiates the testing. In some embodiments, at least 1, 2, 3, 4, 5, 10, 50 or 100 computers are used to conduct the digital guidance content testing. In some embodiments, the browser pool may be configured as a queue and pull based implementation. In other words, the queue does not push the testing tasks to the various browsers in the pool but rather it waits for each browser to request the tasks. All the tests that are supposed to be run are moved into a queue. As and when a node (browser) is available for testing, the node asks the queue and pulls the next available test. The queue ensures that one test is passed on to only one browser.

Advantages to using testing system 600 and related systems and methods according to the present disclosure include but are not limited to the following:

a. The ability to bypass firewall rules and test the flows and other digital guidance content on underlying applications which are only accessible in private networks.

b. Turn any user's computer into a testing system, eliminating the need for a special test setup.

c. Run tests on a set up closest to the actual end users' set up.

d. Helps turn any user into a tester/Quality Assurance person, removing the dependency on Information Technology/developer teams.

e. Run tests in the background on a user's computer without blocking the user from their primary tasks.

f. Provide digital content editing and testing capabilities in the same software application/browser extension.

Various alternatives, modifications, and equivalents may be used in lieu of the above components. Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices.

Each program may be implemented in a high-level procedural or object-oriented programming language to operate in conjunction with a computer system. However, the programs may be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control or perform any of the steps, including but not limited to: displaying, communicating with the user, analyzing, modifying parameters (including timing, frequency, intensity, etc.), determining, alerting, or the like.

While exemplary embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached, or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. When a feature is described as optional, that does not necessarily mean that other features not described as optional are required.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of creating, testing and providing digital guidance for use in an underlying computer application, the method comprising the steps of:
   providing a plurality of computers each having access to a closed network that is separated from an open network by a firewall;
   providing a browser extension on each of the plurality of computers having access to the closed network to form a browser pool;
   allowing any of the browser extensions to create a pull-based queue configured to wait for others of the browser extensions to opt into the browser pool and request a testing task, the queue assigning each of the browser extensions that has opted into the browser pool at least one testing task and ensuring that each of the testing tasks is passed on to only one of the browser extensions;
   providing an application to be tested on the closed network;
   using a first one of the browser extensions to record steps of digital guidance content as the steps are created by a content author;
   automatically testing the digital guidance content, using a queue created by the first browser extension, wherein the testing comprises:
      receiving an execute testing command from the content author on a dashboard displayed on the first browser extension;
      fetching test case data from a server on the open network to the first browser extension;
      executing a test case in the first browser using the test case data;
      running tests on the test case in a background tab of each of the browser extensions that opted into the browser pool;
      recording in the first browser extension passes and failures of the tests, if any;
      sending reports of the passes and failures of the tests from the first browser extension to the server on the open network;
      sending a notification to the content author that results of the automatic testing are ready to view; and
      displaying the results of the automatic testing in the dashboard; and
   making the digital guidance content available for playback to an end user on a computing device after the digital guidance content has been automatically tested, whereby the application being tested need not be accessible to the open network for the digital guidance content testing to occur.

2. The method of claim 1, wherein each of the steps of the automatic testing of the digital guidance content are performed on multiple browsers simultaneously.

3. The method of claim 2, wherein the multiple browsers include different browser types.

4. The method of claim 2, wherein the steps of the automatic testing are performed in the background of each of the browsers.

5. The method of claim 2, wherein each of the browsers is running on a separate computer.

6. A non-transitory computer readable medium having instructions stored thereon for creating, testing and providing digital guidance in an underlying computer application, wherein the instructions are executable by a processor to cause a first browser extension provided on at least one of a plurality of computers, each of the plurality of computers having access to a closed network that is separated from an open network by a firewall, to form a browser pool by allowing the first browser extension to create a pull-based queue configured to wait for browser extensions provided on others of the plurality of computers to opt into the browser pool and request a testing task, the queue assigning each of the browser extensions that has opted into the browser pool at least one testing task and ensuring that each of the testing tasks is passed on to only one of the browser extensions,
   wherein the instructions are executable by the processor to further cause the first browser extension to test an application provided on the closed network by:
   recording steps of digital guidance content as the steps are created by a content author;
   automatically testing the digital guidance content, using a queue created by the first browser extension, wherein the testing comprises:
      receiving an execute testing command from the content author on a dashboard displayed on the first browser extension;
      fetching test case data from a server on the open network to the first browser extension;
      executing a test case in the first browser using the test case data;
      running tests on the test case in a background tab of each of the browser extensions that opted into the browser pool;
      recording in the first browser extension passes and failures of the tests, if any;
      sending reports of the passes and failures of the tests from the first browser extension to the server on the open network;
      sending a notification to the content author that results of the automatic testing are ready to view; and
      displaying the results of the automatic testing in the dashboard; and
   making the digital guidance content available for playback to an end user on a computing device after the digital guidance content has been automatically tested, whereby the application being tested need not be accessible to the open network for the digital guidance content testing to occur.

7. The non-transitory computer readable medium of claim 6, wherein the instructions are configured to have each of the steps of the automatic testing of the digital guidance content performed on multiple browsers simultaneously.

8. The non-transitory computer readable medium of claim 7, wherein the multiple browsers may be of different browser types.

9. The non-transitory computer readable medium of claim 7, wherein the instructions are configured to have the steps of the automatic testing performed in the background of each of the browsers.

10. The non-transitory computer readable medium of claim 7, wherein the instructions are configured to have each of the browsers running on a separate computer.

* * * * *